(12) United States Patent
Veits

(10) Patent No.: US 8,429,279 B2
(45) Date of Patent: Apr. 23, 2013

(54) METHOD AND DEVICE FOR CONNECTING PACKET-ORIENTED COMMUNICATION TERMINALS

(75) Inventor: Oliver Veits, Dachau (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 425 days.

(21) Appl. No.: 12/680,343

(22) PCT Filed: Sep. 28, 2007

(86) PCT No.: PCT/EP2007/008484
§ 371 (c)(1),
(2), (4) Date: Mar. 29, 2010

(87) PCT Pub. No.: WO2009/046729
PCT Pub. Date: Apr. 16, 2009

(65) Prior Publication Data
US 2010/0312880 A1    Dec. 9, 2010

(51) Int. Cl.
*G06F 15/16* (2006.01)
(52) U.S. Cl.
USPC .......................................................... 709/227
(58) Field of Classification Search ................... 709/224, 709/227–228
See application file for complete search history.

(56) References Cited

U.S. PATENT DOCUMENTS

2005/0125532 A1* 6/2005 Kimchi .......................... 709/225
2007/0220162 A1* 9/2007 Levin et al. ................... 709/231
2009/0013399 A1* 1/2009 Cottrell et al. .................. 726/12
2009/0190506 A1* 7/2009 Belling et al. ................ 370/259
2010/0189099 A1* 7/2010 Bae et al. ...................... 370/352

OTHER PUBLICATIONS

International Preliminary Repeort on Patentability for PCT/EP2007/008484 date Jun. 17, 2010 (Forms PCT/IB/338, PCT/IB/373, and PCT/ISA/237 (English Translation).
International Search Report for PCT/EP2007/008484 dated Jul. 1, 2008 (Form PCT/ISA/210).
Rosenberg et al. "NAT and Firewall Scenarios and Solutions for SIP", Internet Engineering Task Force, Jun. 24, 2002, pp. 1-60.

* cited by examiner

*Primary Examiner* — Jason Recek
(74) *Attorney, Agent, or Firm* — Buchanan Ingersoll & Rooney PC

(57) ABSTRACT

The invention relates to a method and an arrangement for connecting packet-oriented communication terminals, wherein a first communication terminal (P1) is arranged in a first network (LAN), the first network (LAN) being connected to a second network (INT) via a network address-translating unit (NAT), a second communication terminal (P2) being arranged in said second network. For this purpose, a proxy (P) is provided in the gateway (GW) for intercepting or listening to messages, in that a STUN, ICE, or TURN protocol is implemented. The concept of the invention is to implement, on a case by case basis, IP address spoofing or port number spoofing and a "RESPONSE ADDRESS" STUN field in the proxy, thereby performing the STUN or ICE protocol not on the respective communication terminals, but at a third part on another unit. A performance takes place even if the central unit is not located in the user data path between the STUN server STUN and the respective communication terminal.

20 Claims, 1 Drawing Sheet

METHOD AND DEVICE FOR CONNECTING PACKET-ORIENTED COMMUNICATION TERMINALS

CROSS-REFERENCE TO RELATED APPLICATIONS

This application is the United States national phase under 35 U.S.C. §371 of PCT International Application No. PCT/EP2007/008484, filed on Sep. 28, 2007. That application is incorporated by reference herein.

BACKGROUND OF THE INVENTION

1. Field of the Invention

Embodiments herein relate to methods and systems for connecting packet-oriented communication terminals which are separated through a network address-translating unit and in which a gateway controls the transmission of a local communication terminal.

2. Background of the Art

Packet-oriented networks have been separated from other packet-oriented networks passing through them by placing a so-called "NAT device" or NAT unit (Network Address Translation) between networks. Such a NAT unit is found frequently at the boundary between a local network or LAN (Local Area Network) and a public network generally identified as the "Internet".

The NAT unit enables the use of one set of IP addresses (Internet Protocol) for a LAN internal data packet exchange and another set of IP addresses for an external data packet exchange. In the case of an internal data packet exchange, private IP addresses are also referred to here, while in the case of an external data packet exchange, external IP addresses are referred to here.

The basic principle of NAT is the assignment (mapping) of each private IP address to a corresponding public IP address. This mapping is also called "binding" and is generally limited to a certain period of time.

A further embodiment of said NAT unit is known by the name NAPT (Network Address & Port Translation). In this case there is an additional reference of external port numbers to internal port numbers. NAT and NAPT are described in the publication RFC 3022 from the IETF (Internet Engineering Task Force).

The simplest implementation of NAT is modifying the source address of a data packet sent from the LAN. This process is called "Source NAT".

In an incoming data packet, i.e., a data packet sent from a public network to the LAN, can have its destination address modified. This process is called "Destination NAT". Typically, for correct mapping of the arriving data packets through the Destination NAT process, it is assumed that the NAT unit has a mapping table in which mapping or binding is recorded between the public address recorded in the header of the data packet and a private address to be mapped. Such binding assumes that, for the incoming data packet, an outgoing data packet was sent, based on whose source and destination addresses a binding was created. With the exception of a so-called "Full Cone NAT", it is usually not possible to initiate a data packet exchange from outside of the LAN.

This is especially hindering for communication protocols in which a calling subscriber is attempting to reach a called subscriber in a LAN. When using communication protocols, e.g. SIP (Session Initiation Protocol) or H.323, problems regularly occur with NAT units.

A further problem emerges due to the fact that, although modifying the data packet through the NAT unit allows for a change in the address of the data heading entries or "Header" of the data packet, information at higher levels, in particular SIP, is not taken into account.

Methods have been reported to partially solve these problems. In particular, there are protocols called STUN (Simple Traversal of UDP through NAT), UPnP (Universal Plug and Play), TURN (Traversal Using Relay NAT) and ICE (Interactive Connectivity Establishment) which partially ensure the correct delivery of data packets.

These methods are dependent primarily on the implementation of a corresponding protocol stack in the participating communication terminals. In communication terminals, this involves packet-oriented communicating telephones—with differing processing performances depending on their designs—or computers with corresponding audio and/or video communication capabilities. Such communication terminals are commonly known as VoIP communication terminals (Voice over Internet Protocol) in the professional world.

BRIEF SUMMARY OF THE INVENTION

It would be helpful to provide an improved communication connection across network boundaries which requires no implementation of a corresponding protocol stack in the communication terminals.

Embodiments of the invention may be used in an environment where the first communication terminal is arranged in a first network, for example a local network or also a LAN. This first network is connected via a network address translation unit or NAT unit to a second network, e.g. a "public" network. In this second network, a second communication terminal is provided which is designed to be the communication partner with the first communication terminal. That second communication terminal is either the initiator or the destination of a communication link to be established, i.e., assumes either a calling or a called role.

Furthermore, there is a gateway provided in the first network which is used for administration, login and transmission of the first communication terminal. The gateway, in its general form, controls transmission from the first communication terminal.

This gateway includes a proxy that is set up for an "interception", i.e., for intercepting or listening to messages intended for the first communication terminal and/or sent from the first communication terminal. The data exchanged using the message may be signaling data or user data.

A network protocol may be implemented in the proxy for detection and penetration of the network address-translating unit—i.e., the NAT unit—in cooperation with a server. STUN, TURN, ICE or a combination of the three protocols, for example, is used as the network protocol for detection and penetration of the network address-translating unit. The server works correspondingly as a STUN server, TURN server or ICE server.

According to the invention, the proxy replies to a first message sent from the server to the first communication terminal instead of replying to the first communication terminal, using a second message. The second message is configured depending on the status of the communication in such a way that an address and/or port number of the first communication terminal is entered as the sender address and/or sender port number. This parameter of a sender address or port number that does not match the particular sender address or port number is called "Spoofing" in the industry.

Alternatively or in addition, there is an option provided in the second message to set up a network protocol for detection and penetration of the network address-translating unit (NAT) according to the network protocol, which arranges the transmission to the first communication terminal (P1) of the response to the second message. This is the "RESPONSE-ADDRESS" option, in which an alternative transmission address is entered in a corresponding "RESPONSE ADDRESS" field when it is configured.

Embodiments of the invention incorporate the concept of having a central controller combine IP address spoofing and/or port number spoofing with a "RESPONSE ADDRESS" STUN field on a case-by-case basis (STUN and/or ICE proxy in the gateway), wherein the STUN or ICE protocol is stored on and run not on each respective communication terminal but rather on another unit. It can then run even if the central unit is not located in the user data path between the STUN server STUN and the respective communication terminal.

An example of performance with further advantages and embodiments of the invention is explained in the following based on the drawings.

DETAILED DESCRIPTION OF THE INVENTION

In the following, two network topologies based on FIGS. 1 and 2 will first be explained in which the respective embodiments of the invention described below are the method of choice.

Figure 1:
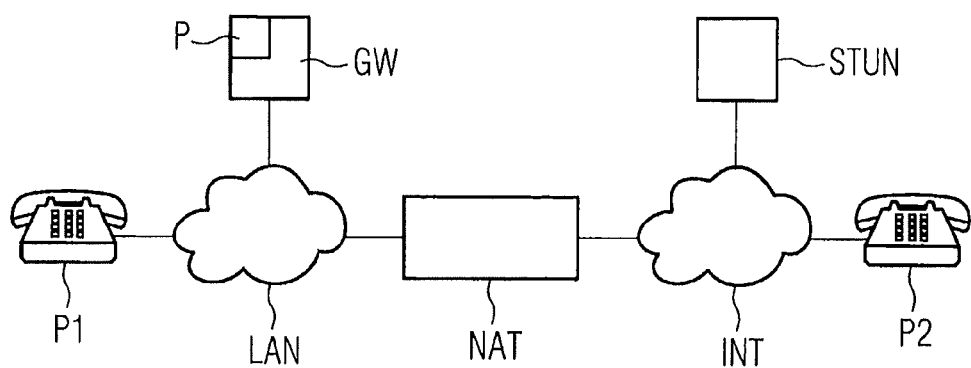
FIG. 1: A structural diagram with schematic representation of a communication environment according a first network topology.

FIG. 1 shows a first packet-oriented network LAN to which a first communication terminal P1, a gateway GW, and a NAT unit NAT are connected. The NAT unit NAT is connected through a further interface to a second packet-oriented network INT. In addition, a STUN server STUN and a second communication terminal P2 are connected to the second packet-oriented network INT. A proxy P is mapped to the gateway GW and in the topology assumed here is integrated into the gateway GW. It is the preference of the specialist whether to select a separate decentralized or subdivided assignment of the proxy P to the gateway GW.

Figure 2:
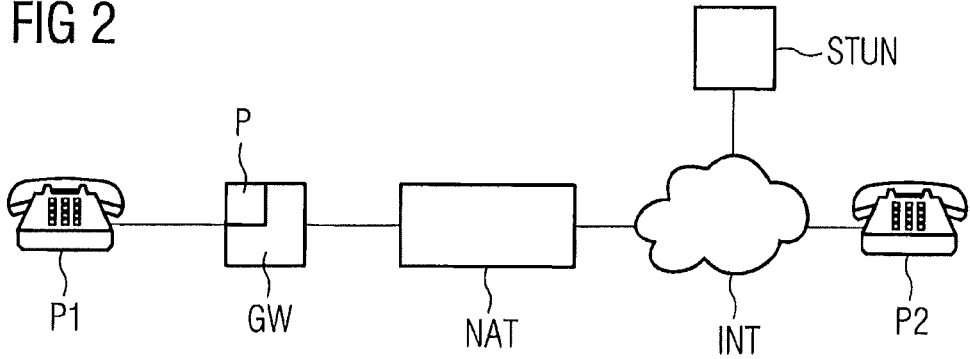
FIG. 2: A structural diagram with schematic representation of a communication environment according a second network topology.

FIG. 2 shows the first communication terminal P1 which is connected to the gateway GW, which is linked in turn to the NAT unit NAT. The NAT unit NAT is connected through a further interface to the second packet-oriented network INT, and the STUN server STUN and the second communication terminal P2 are also connected to the second packet-oriented network INT. A proxy P is mapped to the gateway GW and in the topology assumed here is integrated into the gateway GW. It is the preference of the specialist here as well whether to select a separate decentralized or subdivided assignment of the proxy P to the gateway GW.

In embodiments shown, the first communication terminal P1 is represented by the example of a "Local Client", which can be largely any communication terminal that is situated in the domain and/or in network topological proximity to the gateway GW. The example of a first communication terminal P1 here is a largely any calling communication terminal. The second communication terminal P2 is, in contrast, a "Remote Client" as an example, therefore largely any called communication terminal outside of the domain and/or the network's topological proximity to the gateway GW.

While in the topology according to FIG. 1 the gateway GW is arranged as indirect—i.e., in the data path between the first communication terminal P1 and the NAT unit NAT with respect to the signaling messages exchanged by the first communication terminal P1—in the topology according to FIG. 1, the gateway GW is arranged directly in the data path between the first communication terminal P1 and the NAT unit NAT. A direct arrangement means that the Gateway GW is placed in the data path for the user data as well as the signaling data between the first communication terminal P1 and its communication partner, i.e., the second communication terminal (P2).

The first communication terminal P1 is registered on the gateway GW. The gateway GW consists of a VoIP (Voice-over IP) gateway, for example, and the first network LAN is a private network, for example, generally also called a LAN (Local Address Network). The NAT unit NAT is located between the private first network LAN and the example here of a public second network INT. This NAT unit NAT executes the substitution of the private IP address with a public IP address.

If the NAT unit is set up additionally for a substitution of the private port or port number with a public port, is will also be referred to as a NAT/PAT (Network Address Translation/Port Address Translation) unit.

Because the second communication terminal P2 cannot respond to the first communication terminal P1 with this private address, the private IP addresses and port numbers which are exchanged during signaling must be translated into a public IP address or port number.

In the current state of the art, such a translation is generally performed by the NAT unit or the first communication terminal P1. Therefore, NAT units are known that are also called Application Layer Gateway (ALG). This type of ALG is able to extract the signaling messages contained in addresses and to create translated and modified signaling messages. These are called SIP-ALG or H.323-ALG depending on the protocol used.

For cases in which the NAT unit NAT interconnected in the data portion is not configured as an ALG, the first communication terminal P1 must carry out the corresponding substitution in the corresponding signaling messages. For this purpose, the public Internet address and port number must be known to the communication terminal P1. In order to obtain them, the STUN server STUN queries the first communication terminal P1.

In the case of expanded protocol Interactive Connectivity Establishment (ICE), the STUN mechanism is expanded such that symmetric NAT situations can also be handled. Such symmetric NAT situations occur, for example, in cases where the NAT/PAT translation of the source Internet address and the source port number depends on the destination Internet address or the destination port number.

In order to achieve this, the first communication terminal P1 reserves all available Internet addresses at which it could possibly be reached, including both private Internet addresses and addresses provided by a STUN or a TURN server, for example. These addresses are all contained in a corresponding signaling message. Such a collection of IP addresses or port numbers will also be subsequently referred to herein as a "Candidate List".

The called communication terminal extracts the reserved addresses from the signaling message and tests these one after another. For this, STUN queries are sent to all addresses and the opposite communication terminal will respond to each of these STUN queries. This means that all communication terminals P1, P2 must have a STUN client application as well as a STUN server application implemented for support of the ICE method.

The inventive means will be described based on the following multiple examples of embodiments. An overall concept of the embodiments consists of applying "IP Address Spoofing" and a "RESPONSE ADDRESS" STUN field to a central controller (STUN or ICE proxy P in the gateway GW) on a case-by-case basis and with that running the STUN or ICE protocol not on each respective communication terminal P1, P2 but rather on another unit. It can then run even if the central unit is not located in the user data path between the STUN server STUN and the respective communication terminal P1, P2.

In the following, a first embodiment of the invention will be described with reference to FIG. 2. In this first embodiment, it will be assumed, as with all the following embodiments, that the NAT unit NAT is not configured as an ALG and that the participating communication terminals P1, P2 are not able to process STUN queries.

According to the first embodiment, the gateway GW is mapped directly in the data path between the first communication terminal P1 and the NAT unit NAT. The gateway GW is further configured as a STUN proxy P. The gateway GW is situated on the data path so that it lies between the first communication terminal P1 and the NAT unit NAT and in the user data path as well as the signaling data path between the first communication terminal and its communication partner, here, the second communication terminal P2.

The gateway GW configured with STUN proxy P and the gateway GW are often represented in the following description as the same functional unit, namely a "Proxy Functionality Expanded Gateway." Similarly, in the description of the means according to the invention, the STUN proxy P on one side and the gateway GW on the other side are assumed to be functionally identical. The respective selected description implies a protocol processing character of the STUN proxy P on one side and the character of the gateway GW as an addressable unit on the other side. This also applies to the further embodiment examples with a corresponding TURN or ICE proxy P that follow from the first embodiment example.

The function of the gateway GW configured with additional functionality is that the Gateway GW can perform STUN protocol processing in the STUN proxy P, instead of the first communication terminal P1. In the following, this STUN protocol processing is outlined on a step-by-step basis.
1.1 The gateway GW intercepts a signaling message sent from the first communication terminal P1 (Interception) and saves its contents. Such a signaling message consists of a normally configured H.323 or SIP message, for example. The signaling message contains information about the private IP address (Internet Protocol) and an accompanying TCP/UDP (Transmission Control Protocol/User Datagram Protocol) port which is intended to be used by the first communication terminal P1 for exchange of communication information.
1.2 The Gateway GW now sends STUN queries to the STUN Server STUN wherein the Gateway GW does not use its own address and own port number, but rather the address or port number referred to from 1.1. In other words, the gateway GW provides a different address and port number from its own and with that carries out "IP address spoofing" as well as "port spoofing".
1.3 The gateway GW intercepts a STUN message sent by the STUN server STUN in response to one of the STUN queries, which is directed to the private IP address and the private port number of the first communication terminal P1.
1.4 The public IP address and the public port number are extracted from the STUN response.
1.5 The private IP address and the private port number are substituted through the accompanying public IP address and the accompanying public port number of the communication terminal. The last named public entries come from the STUN response extracted according to 1.3 and 1.4.
1.6 A correspondingly modified signaling message is now sent to the destination that was identified in the layer-3 header of the signaling message.

The communication partner of the first communication terminal P1, i.e., the second communication terminal P2, can now extract the translated public IP address and port number from the signaling message and can now create a direct media connection with the first communication terminal P1, which is accompanied by an exchange of user data.

In the following, a second embodiment of the invention will be explained with reference to FIG. 1.

In a general scenario, it is now assumed that the STUN proxy P that is implemented in the gateway GW is arranged or interconnected in the data path relating to signaling messages but not in the data path relating to user data messages—the so-called media path. In such a case, the procedure step 1.3 according to the first embodiment could not be carried out without further changes in the process, because the gateway GW with the STUN proxy P implemented in it is not located in the data path for user data messages and therefore is no longer able to intercept a STUN response that is sent from the STUN server to the first communication terminal P1.

As part of the solution according to the invention, a "RESPONSE ADDRESS" option is used, which is defined in the publication RFC 3489 describing the STUN procedure. This option is used to configure the STUN request; see also procedure step 1.2 in the first embodiment example. The following is a detailed description of the individual steps that are carried out with the involvement of the STUN proxy P in gateway GW.
2.0 The Gateway GW sends a STUN request to the STUN server STUN using its own IP address and its own port number. This step 2.0 is not included in the first embodiment.
2.1 The public IP address and the public port number of the STUN proxy P arranged in the gateway GW is saved after the arrival of the STUN response. This step 2.1 has no parallel in the first embodiment.
2.2 Steps 2.0 and 2.1 are repeated at periodic time intervals so that a firewall (not shown) and/or the NAT unit NAT holds a corresponding data path open. If this data path is not held open, either the firewall or the NAT unit NAT will close the corresponding port so that the packet-oriented network LAN can no longer be reached from the outside. This step 2.2 has no parallel in the first embodiment.
2.3 While the procedure step 2.2 is continued, the gateway GW listens for signaling messages on the first network LAN on the side of the first communication terminal P1. If those types of signaling messages are available on the side of the first communication terminal P1, they are intercepted and their contents saved in the gateway GW. This saved material includes information about the private IP address and respective TCP or UDP Port of the first communication terminal P1, which the first communication terminal P1 intended to use to receive user data. Corresponding information about the communication terminal P2 to be called is also retained.

2.4 In a further step, STUN queries are now sent from the gateway GW to the STUN server STUN. However, these queries are not sent with the gateway's own address. Instead, the gateway GW send queries using the IP address and source port which were respectively extracted and saved. In other words, the gateway GW carries out IP address spoofing as well as port spoofing here. In the aforementioned STUN request, the "RESPONSE ADDRESS" option is used. This indicates to the STUN server that the response to the STUN request should not be sent to the first communication terminal, i.e., the spoofing-equipped sender of the STUN query, but rather to a recipient specified in the "RESPONSE ADDRESS" field. The public IP address and the corresponding public port number of the STUN proxy P saved in step 2.1 are entered as the recipient specified in the "RESPONSE ADDRESS" field.

2.5 Based on the actions in Step 2.4, the STUN response is sent to the STUN proxy P of the gateway GW instead of the first communication terminal P1.

2.6 The public IP address and the public port of the first communication terminal are extracted from the STUN response by the gateway GW.

2.7 The Gateway GW replaces the private IP address and the private port number of the first communication terminal P1 with the respective public IP address and public port number, which were extracted from the STUN response described in step 2.5.

2.8 An appropriately modified signaling message is sent to the destination that was identified in the layer-3 header of the signaling message.

With steps 2.0, 2.1, and 2.2 it is finally ensured that the gateway GW on the side of the second-packet-oriented network INT or Internet remains reachable and addressable. In an alternative design of the second embodiment, steps 2.0, 2.1, and 2.2 are skipped and instead a public network address is used on the Gateway GW. In this alternative design, in step 2.4 the public address of the gateway GW is entered in the "RESPONSE ADDRESS" field.

In one of the following examples of a third embodiment of the invention, the protocol TURN is used instead of the protocol STUN. This procedure is identical to the second embodiment of the method up to the substitution of the term "STUN" with the term "TURN".

In the following, a fourth embodiment of the invention is presented which uses the protocol ICE (Interactive Connectivity Establishment). For this, reference is made to FIG. 2 again that locates the gateway GW in the data path for user data messages as well as signaling messages. A position "in the data path" means that, similar to the first embodiment, both the signaling and user data messages (media messages) are passed through the gateway GW. In the gateway GW, a corresponding ICE proxy P is implemented.

With the involvement of the ICE Proxy P in gateway GW, the following steps are carried out, which are numbered corresponding to the direction of their user data messages. Beginning with 4.1, the numbered steps are carried out starting from the local client in the direction of the remote client, therefore outbound from the calling first communication terminal P1 in the direction of the called second communication terminal P2. Beginning with 4.2, the numbered steps are carried out starting from the remote client in the direction of the local client, therefore outbound from the called second communication terminal P2 in the direction of the calling first communication terminal P1.

4.1.1 Signaling messages of the second communication terminal P2 are intercepted on the side of the gateway GW. These signaling messages would also be optionally sent to a VoIP gateway at level 3—not shown—arranged on a second network INT. The signaling message contains if applicable a candidate list with possible IP addresses and port numbers of the second communication terminal P2.

4.1.2 The address of the communication terminal P2 is extracted from the signaling message.

4.1.3 The ICE proxy P in the gateway GW sends a STUN request to the address of the second communication terminal P2, where the addresses used are the IP address and port number of the second communication terminal P2 which are extracted in step 4.1.2 from the signaling message. Furthermore, for identification of the sender, instead of using the gateway's GW own IP address and port number, the respective source IP address and source port number extracted from the signaling message are used according to step 4.1.2. In other words, IP address spoofing and port spoofing are used.

4.1.4 A STUN response sent from the public network range INT in the direction of the first communication terminal P1 is intercepted by the Gateway GW.

4.1.5 From the STUN response, the source IP address and the source port number are extracted from the level 3 header.

4.1.6 The candidate list with possible IP addresses and port numbers of the second communication terminal P2 that is associated with the signaling message from step 4.1.1 is replaced by the single IP address specified in step 4.1.5.

4.1.7 The specified addresses and port numbers from the preceding steps are used to create a modified signaling message. This is forwarded to the IP address and port number which were extracted in the level 3 or level 4 header.

While the steps in 4.1 are based on a direction of the user data messages from the first communication terminal P1 going toward the second communication terminal P2, the following sub-steps of 4.2 concern messages sent from the second communication terminal P2 towards the first communication terminal P1.

4.2.1 Performance of steps 1.1 to 1.4 according to the first embodiment of the invention.

4.2.2 Adding of STUN or TURN addresses which are based on the candidate list from step 4.2.1 above. This candidate list is added into a newly generated signaling message that is sent to the target that was identified in the level 3 header of the signaling message.

4.2.3 The opposite end of the communication, i.e., the second communication terminal P2, now checks all candidates from the candidate list by sending them a STUN request. The candidates here are possibly valid IP addresses or corresponding port numbers of the calling partner, that is, the first communication terminal P1. The ICE proxy P intercepts these STUN requests, which were sent to the "Non-ICE aware" communication partner P1, and responds to these appropriately. IP address spoofing is therefore not necessary or absolutely required here.

Although there appears to be similarity—and not only because of identical network topology—between this fourth embodiment and the first embodiment, when ICE is used it actually proves to be different in comparison to the STUN-based first embodiment. ICE shows particularities that must be taken into account in this fourth embodiment.

A simpler situation to handle results when the second communication terminal first sends a signaling message, for example a SIP message. Then the first communication terminal P1 can use the IP address and port number received there for its STUN request and determine from there at which address the local first communication terminal P1 as well as the second communication terminal P2 can be reached. The information can be amended appropriately in SIP or SDP before routing.

A more difficult situation to handle results when the first communication terminal P1 calls the other side, i.e., the second communication terminal P2. On the side of the STUN proxy P, there is no knowledge of to whom a corresponding STUN query should be sent. The solution proposed for this involves getting the other side to share its IP address and port number. For that, the STUN proxy P, which has intercepted an invitation message or "SIP INVITE" message from the local first communication terminal P1, can route this invitation message without IP address and port number. An IP address and port number can follow in a later SIP message. The second communication terminal P2 should respond with an SIP message which contains the IP address and the port number. Now the STUN proxy is in the position to make a STUN query. The STUN proxy P further can submit the IP address and port number of the second communication terminal P2 and adjust the SIP message sent from the second communication terminal P2 appropriately using the information received with the help of the STUN protocol and route that to the first communication terminal P1.

In the following, a fifth embodiment of the invention is described in reference to FIG. 1. In this embodiment, an ICE proxy P is arranged in the data path of the signaling messages but not in the data path of the user data messages.

For sending messages from the direction of the second communication terminal P2 to the first communication terminal P1, there is no "straightforward" solution, because the ICE-enabled opposite side, the second communication terminal P2, performs connection tests which are sent directly to the "non-ICE aware" first communication terminal P1 in the form of STUN queries. The "non-ICE aware" first communication terminal P1 is not able to process these ICE connection tests. Also, the ICE proxy P in the gateway GW cannot intercept such types of STUN requests.

For that reason, the more expensive fifth embodiment is needed, which is related to the handling of user data messages that are sent from the first communication terminal P1 towards the second communication terminal P2.

In both directions, the following is carried out through the ICE proxy P:

5.0.1 The steps 2.0 to 2.2 are carried out with the goal of obtaining the public IP address and the public port number of the ICE proxy P.

For user data messages sent in the framework of the communication link, outbound from the first communication terminal P1 towards the second communication terminal P2, the following is carried out with involvement of the ICE proxy P:

5.1.1 Interception of signaling messages from the second communication terminal P2 to the first communication terminal P1.

5.1.2 The content of the signaling messages is written to a signaling message memory so that it can be used in steps 5.2.3 and 5.1.4.2.

5.1.3 In the following, analogous to the procedure according to steps 2.4 to 2.6, a procedure will be carried out in which a STUN request is sent to the second communication terminal P2 by means of a spoofing address provided, in which the STUN request contains the address of the gateway GW in the "RESPONSE ADDRESS" field and in which the proxy P contains a corresponding response. However, the STUN queries are sent this time to the addresses and port numbers from the candidate list for the communication terminal P2, which were determined in Step 5.1.1. Furthermore, in the option "RESPONSE ADDRESS", the address of the ICE proxy P is entered, so that the response is sent to the ICE proxy P.

5.1.4 The source IP address and the port number are referenced in the layer 3 and layer 4 header of the first response to the STUN query. The IP address and port number of the second communication terminal P2 correspond to those that can be seen by the ICE proxy P.

5.1.5 In the intercepted message from step 5.1.1, all IP addresses and port numbers from the candidate list are removed, with the exception of the entry which agrees with the IP address and port number of the values read in step 5.1.4.

5.1.6 A modified signaling message is now sent to the destination, which can be identified in the layer-3 header of the signaling message.

5.1.7 Optionally, it can be checked in the signaling message memory whether step 5.2 below was already performed and even in the same connection but the opposite direction. If step 5.2 was already performed, step 5.2.4.2 below is performed and checked, in order to determine whether the local address taken from the second communication terminal P2, matches the one already sent to the first communication terminal P1. If step 5.2 was not performed, no action is carried out. If the testing reveals that the local address taken from the second communication terminal P2 matches the one sent to the first communication terminal P1, the connection can be updated to the most current point, e.g., with SIP UPDATE or with SIP re-INVITE MESSAGE, whereby now a corrected IP address and port number is provided.

For user data messages sent in the framework of the communication link, outbound from the second communication terminal P2 towards the first communication terminal P1, the following is carried out with involvement of the ICE proxy P:

5.2.2 Signaling messages are intercepted from the first communication terminal in the direction of the second communication terminal P2 through the gateway GW.

5.2.3 A query of the signaling message memory follows in order to show whether a signaling message was already received in the opposite direction.

5.2.4.1 If the query described in 5.2.3 is negative, i.e., a signaling message was not received in the opposite direction, steps 2.4 to 2.6 are performed with the local IP address and port number of the first communication terminal P1 according to the signaling message. This means that a STUN query is sent to the STUN server STUN, but with the action of the "RESPONSE ADDRESS" option in order to have a response sent to the ICE proxy P. Finally the public IP address and port number for the first communication terminal P1 are extracted from the STUN response message.

5.2.4.2 If the query according to 5.2.3 is positive, i.e., there was already a signaling message received in the opposite direction, steps 2.4 to 2.6 are performed, but this time the STUN query is sent to the addresses extracted from the candidate list of the second communication terminal P2. In this case, the IP address and the port number of the first communication terminal P1 taken from the second communication terminal P2 can be extracted from the STUN response.

5.2.5 The private IP address received in the signaling message is now replaced, wherein the IP address replacing it is either the one which was determined in step 5.1.4.1 or the one which was determined in step 5.1.4.2.

5.2.6 The reworked signaling message is now routed to the destination that was identified in the layer-3 header of the signaling message.

The STUN proxy P according to the invention eliminates the need to integrate STUN or ICE capabilities into communication terminals. This invention also shows how to operate with network topologies in which the STUN proxy P is arranged in the data path of the signaling messages but not in the data path of the user messages.

The invention claimed is:

1. A method for connecting packet-oriented communication terminals, the terminals comprising a first terminal within a first network and a second terminal within a second network, the second network connected to the first network via a network address-translating unit, the method comprising:
   controlling transmission from the first communication terminal to the second network via a gateway, a proxy being assigned to the gateway, the first communication terminal being registered with the gateway;
   the proxy intercepting or receiving a first signaling message sent from the first communication terminal that identifies the second communication terminal as a destination for the first signaling message to establish a communication connection with the second communication terminal;
   the proxy saving content of the first signaling message, the content of the first signaling message comprising a first private address and a first private port of the first communication terminal by which the first communication terminal intends to exchange communication information;
   the proxy querying a server of the second network using the first private address and the first private port of the first communication terminal obtained via the intercepted first signaling message;
   the proxy intercepting or receiving at least one query response message from the server of the second network responding to the querying of the proxy;
   the proxy extracting a first public address and a first public port number of the first communication terminal from the at least one query response message;
   the proxy creating a second signaling message based on the first signaling message, the second signaling message comprising the first public address and first public port to replace the first private address and the first private port of the first signaling message;
   the proxy sending the second signaling message to the second communication terminal such the communication connection is creatable between the first communication terminal and the second communication terminal.

2. The method of claim 1 wherein the gateway is located outside of a data path associated with the first communication terminal, the data path being a communication path by which user data is exchanged between the server and the first communication terminal.

3. The method of claim 1 wherein the gateway is located in a data path by which user data is exchanged between the server and the first communication terminal and also signaling data exchanged between the server and the first communication terminal.

4. The method of claim 1 comprising using at least one member of the group consisting of Simple Traversal of UDP through NAT(STUN), Traversal Using Relay NAT(TURN) and Interactive Connectivity Establishment (ICE) as a network protocol for detection and penetration of the network address-translating unit.

5. The method of claim 1 wherein the proxy intercepts the at least one query response message.

6. The method of claim 1 wherein the proxy querying the server of the second network using the first private address and the first private port of the first communication terminal obtained via the intercepted first signaling message comprises the proxy sending a first query to the server of the second network that comprises the first private address and first private port of the first communication terminal and also has a response address field that identifies a public address and public port of the proxy.

7. The method of claim 6 further comprising:
   the proxy sending a request to the server of the second network that comprises an address and port of the proxy;
   the proxy receiving a response message from the server of the second network responsive to the request sent to the server, the response message identifying a public address and public port of the proxy, the public address and public port of the response address field of the first query being the public address and public port of the proxy identified in the response message.

8. The method of claim 7 further comprising: the proxy repeatedly sending the request to the server of the second network to repeatedly receive the response message from the server of the second network responsive to the request sent to the server to ensure the network address-translating unit holds a data path open for communications between the proxy and the second network.

9. The method of claim 8 wherein the proxy assigned to the gateway is integrated into the gateway.

10. The method of claim 1 wherein the proxy assigned to the gateway is integrated into the gateway.

11. The method of claim 1 wherein the server of the second network is a Simple Traversal of UDP through network address translation server.

12. The method of claim 1 wherein the network address translation unit is an application layer gateway.

13. The method of claim 1 further comprising:
   the proxy intercepting a third signaling message from the second communication terminal that comprises a candidate list having at least one port and address of the second communication terminal; and
   the proxy extracting an address of the second communication terminal from the intercepted third signaling message.

14. The method of claim 1 further comprising:
   sending a first query to the server of the second network that comprises the first private address and first private port of the first communication terminal and also has a response address field that identifies a public address and public port of the proxy;
   the proxy intercepting a third signaling message from the second communication terminal to the first communication terminal;
   the proxy saving content of the third signaling message;
   the proxy sending a request to the server of the second network that comprises the public address and the public port of the proxy;
   the proxy receiving a response message from the server of the second network responsive to the request sent to the server, the response message identifying a public address and public port of the proxy, the public address and public port of the response address field of the first query being the public address and public port of the proxy identified in the response message.

15. A system for connection of packet-oriented communication terminals comprising:
- a first terminal registered with a gateway, the gateway and the first terminal being of a first network, the first network being connected through a network address-translating unit to a second network, the gateway controlling transmission of the first communication terminal to the second network;
- a proxy assigned to the gateway; and
- the proxy intercepting or receiving a first signaling message sent from the first communication terminal that identifies a second communication terminal of the second network as a destination for the first signaling message to establish a communication connection with the second communication terminal;
- the proxy saving content of the first signaling message, the content of the first signaling message comprising a first private address and a first private port of the first communication terminal by which the first communication terminal intends to exchange communication information;
- the proxy querying a server of the second network using the first private address and the first private port of the first communication terminal obtained via the intercepted first signaling message;
- the proxy intercepting or receiving at least one query response message from the server of the second network responding to the querying of the proxy;
- the proxy extracting a first public address and a first public port number of the first communication terminal from the at least one query response message;
- the proxy creating a second signaling message based on the first signaling message, the second signaling message comprising the first public address and first public port to replace the first private address and the first private port of the first signaling message;
- the proxy sending the second signaling message to the second communication terminal such the communication connection is creatable between the first communication terminal and the second communication terminal.

16. The system of claim 15 wherein the proxy assigned to the gateway is integrated into the gateway.

17. The system of claim 15 wherein the proxy querying the server of the second network using the first private address and the first private port of the first communication terminal obtained via the intercepted first signaling message comprises the proxy sending a first query to the server of the second network that comprises the first private address and first private port of the first communication terminal and also has a response address field that identifies a public address and public port of the proxy.

18. The system of claim 17 wherein:
- the proxy sending a request to the server of the second network that comprises an address and port of the proxy; and
- the proxy receiving a response message from the server of the second network responsive to the request sent to the server, the response message identifying a public address and public port of the proxy, the public address and public port of the response address field of the first query being the public address and public port of the proxy identified in the response message.

19. The system of claim 18 wherein the proxy repeatedly sending the request to the server of the second network to repeatedly receive the response message from the server of the second network responsive to the request sent to the server to ensure the network address-translating unit holds a data path open for communications between the proxy and the second network.

20. The system of claim 15 wherein:
- the proxy intercepting a third signaling message from the second communication terminal that comprises a candidate list having at least one port and address of the second communication terminal; and
- the proxy extracting an address of the second communication terminal from the intercepted third signaling message.

* * * * *